United States Patent [19]

Strader

[11] Patent Number: 4,621,727
[45] Date of Patent: Nov. 11, 1986

[54] CONVEYOR BELT DAMAGE SENSOR

[75] Inventor: Don S. Strader, Uniontown, Ohio

[73] Assignee: The Goodyear Tire & Rubber Company, Akron, Ohio

[21] Appl. No.: 765,300

[22] Filed: Aug. 13, 1985

[51] Int. Cl.$^4$ .............................................. B65G 43/00
[52] U.S. Cl. .................................. 198/810; 198/847; 198/856; 340/676
[58] Field of Search ................ 340/676; 198/810, 856, 198/502.1, 847

[56] References Cited

U.S. PATENT DOCUMENTS

| | | | |
|---|---|---|---|
| 3,651,506 | 3/1972 | Olaf et al. | 198/810 X |
| 3,731,113 | 5/1973 | Lowe et al. | 340/676 X |
| 3,731,786 | 5/1973 | Nagata et al. | 198/810 |
| 3,742,477 | 6/1973 | Enabnit | 340/676 |
| 3,922,661 | 11/1975 | Enabnit et al. | 198/810 |
| 3,973,670 | 8/1976 | Spaar | 198/847 |

FOREIGN PATENT DOCUMENTS

| | | | |
|---|---|---|---|
| 467441 | 10/1973 | Australia | 198/856 |
| 2018986 | 11/1971 | Fed. Rep. of Germany | 198/847 |
| 2030796 | 1/1972 | Fed. Rep. of Germany | 198/856 |

Primary Examiner—Joseph E. Valenza
Assistant Examiner—Jonathan D. Holmes
Attorney, Agent, or Firm—R. D. Thompson

[57] ABSTRACT

An improved form of conductor wires utilizing a jacketing envelope for inclusion into a conveyor belt. Low coefficient of friction envelopes form small voids in the conveyor belt carcass to allow the conductors to freely move during flexing of the belt in service. The movement minimizes stress and breakage of the conductor. The belt with arrays of these conductors spaced along the length of the belt may be used in electrical or magnetic rip detection systems for sensing rips in long haul conveyor belts. When an array is damaged the conveyor system can be shut down to minimize the length of the longitudinal rips.

16 Claims, 9 Drawing Figures

CONVEYOR BELT DAMAGE SENSOR

BACKGROUND OF THE INVENTION

This invention relates to a method of installing conductive sensor coils in conveyor belting. The sensor coils are used to detect damage and rips in the conveyor belt during operation. Heavy duty conveyor belting which is used for the transport of bulk materials which have sharp edges such as metallic ores and scrap metals are subject to an ever-present problem with longitudinal slitting or tearing of the belt. This tearing of the belt occurs when a sharp edge is wedged by the conveying system against the conveyor belt carcass causing a tear to occur in the belt carcass. If the belt is not stopped within a short time the tear can continue along extremely long lengths of the belt. Such long tears ruin the belt and cause the loss of otherwise serviceable belt and require considerable down time for replacement. In order to minimize the length of the longitudinal tears or rips in the belt it is known to provide within the belt body transversely oriented conductive arrays spaced longitudinally in the belt carcass. Various types of electrical and magnetic pulses are fed to the conductive arrays and a detector is also provided in the system which determines the continuity of the conductive array. If continuity is disturbed in one of the transversely arranged arrays then a means for stopping the conveyor line is linked to the detector to shut down the movement of the conveyor belt and thus minimize the degree of ripping which occurs.

In order for these damage detector systems to function properly the conductive arrays in the belt must maintain their originally designed shape and electrical properties during normal operation of the belt. If the conductive arrays are subject to damage during routine operations of the belt which alter the desired electrical or magnetic characteristics of the array the damage detection system is prematurely activated without there occurring a major rip in the conveyer. There have been proposed many different forms of conductors which have a common desired characteristic of being capable of being flexed along with normal belt flexing during routine operations. The conductive arrays previously proposed and used have all suffered from the problem of flex fatigue breakage of the array. If such unintended breakage of the conductive array occurs it is extremely difficult and time consuming to replace the array since it is typically embedded within the elastomeric carcass of the conveyor belt.

This invention provides a simple and effective method for embedding conductive sensor arrays within the elastomeric carcass of a conveyor belt. The conductors in the array are free to move within the elastomeric body without stretching, abrading or breaking the conductive material. The conductor can bend or flex without damage along with the belt during operation. This provides exceptionally long service life and assured electrical and magnetic continuity in the conductive array over long service life.

Another aspect of the invention provides an easy method of replacing damaged or defective conductive arrays within the belt body in the field. A further advantage of the invention is that conductive wires may be utilized which have very small cross section and may be used in fabric reinforced, relatively thin cover, belting materials. These and other objects, advantages and benefits of the invention will become more fully apparent as the description proceeds in the following specification and accompanying drawings.

BRIEF DESCRIPTION OF THE INVENTION

One aspect of this invention is a reinforced conveyor belt having included therein a conductor for use in a rip monitoring system, said belt comprising (a) an elastomeric body having an upper carrying surface and a lower pulley engaging surface each parallel to a direction of travel of the belt;

(b) a plurality of reinforcement layers positioned within said elastomeric body extending substantially over the full dimension of said belt;

(c) a plurality of envelopes of low coefficient of friction material positioned within said elastomeric body and spaced apart in the direction of travel of the belt, wherein each envelope establishes a void area in said elastomeric body within said envelope; and (d) a shaped conductor positioned within said envelope such that said conductor is free to move within said void area during operation of said reinforced conveyor belt.

Another aspect of the invention utilizes the belt described above in a belt rip monitoring system including a belt, a means for suspending the belt, a means for driving the belt, a means for detecting electrical signals and a means for controlling the means for driving.

This invention enhances the flex fatigue life of the conductive sensor coils or arrays by providing within the elastomeric belt body a substantially planar void area immediately surrounding the strands of the conductor. The void area is surrounded by an envelope of material which has a very low coefficient of friction or stated another way, a high slip surface. This void area with its surrounding envelope provides the conductor with the capability of moving within the confines of the envelope during normal flexing and movement of the belt. It is to be understood that in heavy duty conveyor belting service the conveyor belt carcass flexes continuously during its travel over the conveying system. Typically the sides of the conveyor belt will trough during the overland haul portions of its movement. It will then flatten out over the loading and discharge ends of the conveyor system and will typically be in a flattened planar state during the return run on the conveyor. As the configuration of the belt changes, any embedded conductor is subject to flexing and inevitably to metal fatigue. The high slip envelope of this invention allows the conductor to freely slide within the envelope and eliminates or at least greatly reduces the amount of fatiguing flex which the conductor must undergo in service. This greatly improves the service life of the conductive array or sensor loop and provides greatly enhanced reliability of the rip detector system.

The envelope material must be capable of providing the void area within the elastomeric body after fabrication and curing of the conveyor belt. As a result of this requirement it is to be appreciated that the envelope must be capable of maintaining its planar shape during the heat of vulcanization since most of these heavy duty conveyor belts are made from vulcanizable rubber polymers such as natural rubber SPR poly butadiene neoprene. Of course polyvinyl chloride or urethane belting materials are also considered to be elastomeric materials within the scope of this invention. Preferred low coefficient of friction materials from which the envelope of this invention may be fabricated are synthetic thermoplastic resins which are resistant to deformation at the vulcanization or curing temperatures employed in the manufacturing of the belt. A common range of vulcanization temperature is between 125° C. and 200° C. A screening test for the suitability of the material chosen for the envelope is to place a strip of the material in a generally horizontal position clamped only at one end and free at the other end. This strip should be subjected to the temperature which is encountered in vulcanization of the particular belting product for approximately thirty minutes, cooled and then examined to determine whether permanent deformation of the strip has occurred during this temperature exposure. A thermoplastic resin which has a softening point above the temperature range specified would be a suitable candidate for fabrication into the envelope of the invention. Representative examples of thermoplastic resins which may be considered useful include: polyesters and copolyesters: polyacrylates; polycarbonates; poly(amide-imide); nylon; acrylics; polyvinylchloride; polyurethanes; nitrile resins; silicones and fluorocarbon plastics, such as CTFE, EFTE, FEP, PTFE, and PVF. A particularly preferred material is biaxially oriented polyethylene terephthalate (PET) sold by 3M Company under the tradename Mylar TM. In belts made from elastomers requiring low or ambient manufacturing temperatures such as some urethane and PVC belting, other thermoplastic resins having low softening points or deflection temperatures may be used. Representative materials include polyethylene, polystyrene, PVC, acetates, block polymers of styrene and butadiene or isoprene, nitrile rubber blends where PVC is the majority component.

The envelope should have a shape complementary to the desired shape of the array or coil being utilized in the rip sensing system. The free area which forms the void within the belt should be considerably wider than the conductor itself. The envelope may be formed using opposed planar sheets of the thermoplastic material which are joined at the edges by a suitable adhesive or by heat fusion. It is understood, of course, that other means for forming the envelope including extrusion of a hollow profile may also be utilized. The outer surface of the envelope may be adhered to the elastomeric body of the belt or it may be unadhered.

Any suitable conductor may be used to form the desired array. Many such conductors are known in the art including solid wire, braided wire and flattened braided wire. The flattened form is a particularly preferred form of braided wire which gives inherently improved ability to absorb longitudinal stress due to the crimping of the braid configuration. The flattened wire braid conductor is specially preferred due to its reduced cross-section. Reduced profile conductors are particularly useful in relatively thin belts. One known configuration of conductor is a braided wire which has been formed into a coil and then flattened to produce a linear conductor which has a multiplicity of overlapping spirals. This configuration again enhances the ability of the conductor to resist breakage during longitudinal stretching in service. The disadvantage of this coiled configuration is that the profile is 4 to 5 times the diameter of the conductor.

It is understood that any suitable conductor chosen may be formed into any desired shape within the elastomeric body of the belt. Complex polygons are known as well as loops which include a modified figure eight and many other configurations. The conductor is most preferably a high ductility relatively low tensile wire such as copper brass.

The invention is useful in any type of a reinforced elastomeric belt. The rip detecting systems are typically used on cable reinforced belting due to the likelihood that it is being used in a mining type application where very high working tensions are placed on the system and wire cable reinforcement is required. This invention may also be useful in fabric reinforced belts where heretofore rip detection systems have not commonly been incorporated since the conductors have generally been very high strength, high profile arrays which cannot be easily embedded within a relatively thin cross-section fabric reinforced belt.

DETAILED DESCRIPTION OF THE INVENTION

Figure 1:
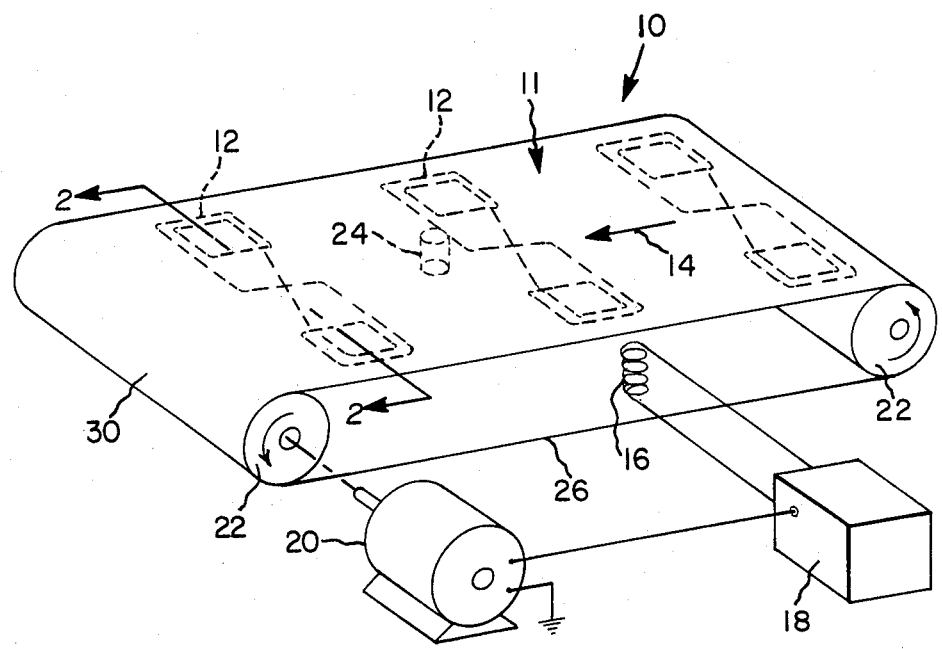
FIG. 1 is a simplified perspective view of a belt damage monitoring system.

In FIG. 1 a belt rip monitoring system 10 is illustrated. A belt conveyor 11 is shown with a plurality of sensor wires 12 embedded in the belt 30 transverse to the direction of belt motion indicated by arrow 14. The sensors 12 are simplified schematic representations of closed circuited conductive wire loops which are conventionally known to be used in belt damage detection systems. U.S. Pat. No. 3,742,477 and U.S. Pat. Nos. 3,831,161 and 3,922,661 as well as U.S. Pat. No. 3,731,113 all describe various sensor embodiments useful with this invention. The sensor coils 12 are utilized in the belt damage control system for the purpose of creating either magnetic or electrical fields depending on the type of detection system utilized. The sensors 12 are commonly used to transmit or generate a detection signal via the conductive coupling that exists during the passage of the sensor loop over the detector 16. U.S. Pat. Nos. 3,742,477 and 3,831,161 describe detection circuitry useful in such systems. The detector 16 provides a signal to the control module 18 which is capable of shutting down the motive means of the conveying system. In FIG. 1 the control module is linked to the motor 20 shown driving the plurality of rollers 22 which support the belt 12. It is understood that the control module may be a manual system whereby the detector provides only an indication of belt damage and the control may be provided by an operator who can shut down the system as desired. It is clear to one skilled in the art that the control means 18 may be programmed to automatically shut down the motion of the system upon detection of a broken sensor coil 12. The operation of the detector module 16 may be based on positive or negative feedback from an optional signal generator 24 positioned proximate to the moving sensor coils 12.

This invention is directed at a method of installing sensors 12 into the belt 30 in order to minimize the possibility that the coils become damaged during routine service rather than by major rips or tears in the system.

The detector module 16 may be any known detector including one which measures the resistance of the loop across the belt, measurement of magnetic flux across the belt, change in capacitance or dielectric field across the belt or measurement of changes in electromagnetic field across the belt. All the foregoing methods are known and practiced in the belt rip detection systems. Any one utilizes a conductor transversely across the belt which must be protected from fatigue breakage in order for the detection system to work reliably in service. It should be noted that the sensors 12 may extend completely across the belt so that it is in contact with the belt edge 26 or the coil may be spaced away from the edge 26 depending on the type of detection module utilized in the rip detection system. The detector module may actually contact the edge of the belt or may be removed therefrom by an air cap.

Figure 2:
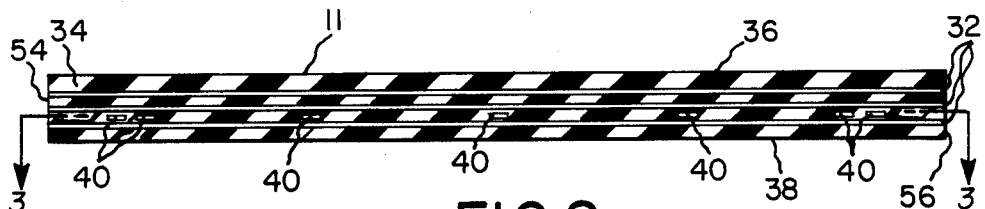
FIG. 2 is a transverse cross-section of the belt of FIG. 1, taken along line 2—2 including the enveloped conductor array of this invention.
Figure 3:
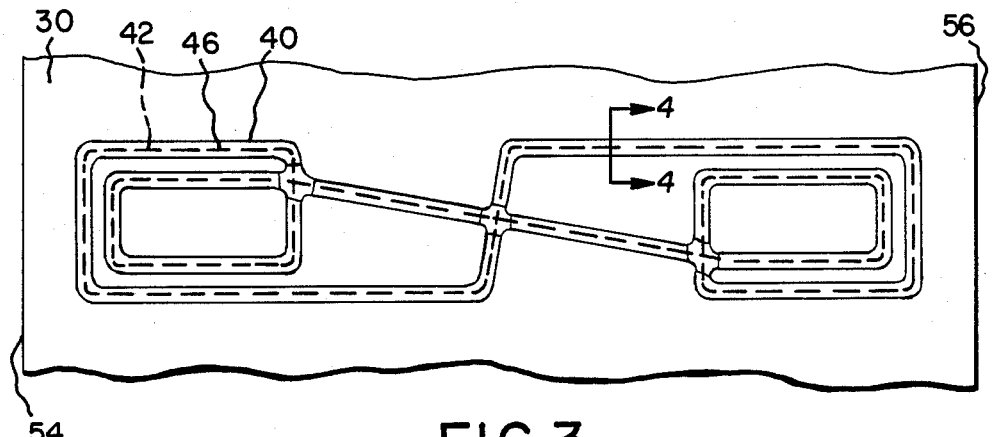
FIG. 3 is a top view of a portion of the belt of FIGS. 1 and 2 cut away to expose one embodiment of the envelope with a conductor of the invention within the belt carcass.

FIG. 2 shows a cross-section perpendicular to the direction of travel of a belt 30 made according to this invention. FIG. 3 shows a top view of a section of the belt 30 cut away to the level just above the conductor 40 along line 3—3.

Figure 4:
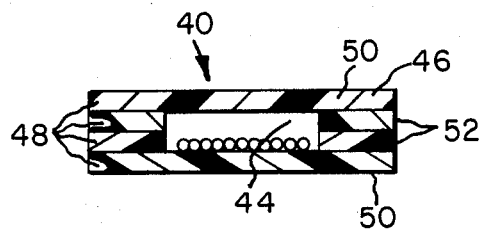
FIG. 4 is an enlarged cross-sectional view of one leg of the conductor taken along line 4—4 in FIG. 3.

FIG. 4 shows an enlarged section cut along line 4—4 of FIG. 3. Belt 30 includes three woven fabric layers 32 embedded within the elastomeric body 34. The elastomeric body is composed of conventional rubber polymers which are compounded and vulcanized under heat and pressure to form the finished elastomeric body 34 of the belt. The belt 30 includes an upper carrying surface 36 and a lower pulley engaging surface 38.

The cut away view, FIG. 3, shows exposed the shaped conductor 40 which consists of a flat cable of woven wire 42 set within the void area 44 created by the envelope 46. The modified FIG. 8 form of the shaped conductor 40 is a particular form useful for inductance negative feedback systems. The envelope 46 is made in a manner which is best shown in the enlarged portion of FIG. 4. In forming the envelope 46, sheets of low coefficient material 48 were heat fused together. A particularly useful material 48 is 0.13 mm biaxially oriented polyethylene terephthalate polyester was used. This material is manufactured by 3M Company under the trademark Mylar TM. A pair of planar matrices which exactly follow the contours of the conductor 40 were cut from the polyester film. These planar matrices 50 were positioned surrounding the conductor 40 with lateral spacing sheets 52 heat fused between the planar facing layers of the envelope 46 to form the void area 44 within which the conductor 42 is free to slide side to side during movement of the belt 30 in service. Any suitable means for sealably joining the sides to form the envelope would be within the contemplation of the invention. Heat sealing is a simple and expedient way of fusing polyethylene terephthalate. In the embodiment shown in FIG. 2 the envelope 46 and the conductor 42 positioned therein is placed between the fabric plies 32. It should be appreciated that the envelope 46 may provide an insulation between the two conductors which cross over at various points in the array. If desired for the particular type of rip detection system being utilized, the conductors 42 could be in contact with each other at the junctions and the envelope simply formed around the joined conductors. In installations where it is desired to completely embed the array comprised of the envelope 46 with the shaped conductor 40 enclosed therein within the belt body it may be desired to space the edge of the array in from the lateral edges 54 and 56 in order that there by protective elastomeric body material between the edges and the conductor. It is to be appreciated then in other systems where it is desired to have a conducting channel completely across the belt width the conductor may actually abut the edges 54 and 56 and exit the envelope 46 near the edge. The flattened conductor cable 42 is composed of 96 strands of number 34 tinplated copper wire braid in the preferred embodiment shown in FIG. 4.

Figure 5:
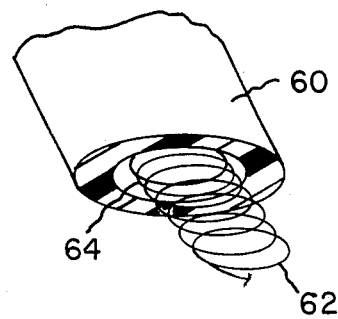
FIG. 5 is an enlarged perspective view of a leg of an alternate embodiment of the conductor and envelope of this invention.

Referring now to FIG. 5, there is shown an envelope 60 which is extruded from thermoplastic resin surrounding a coiled conductor 62. This embodiment simply illustrates an alternative way of manufacturing the envelope with the conductor contained in the void area 64. Any other suitable method of manufacturing the combined envelope and conductor array is suitable for use in this invention.

Figure 6:
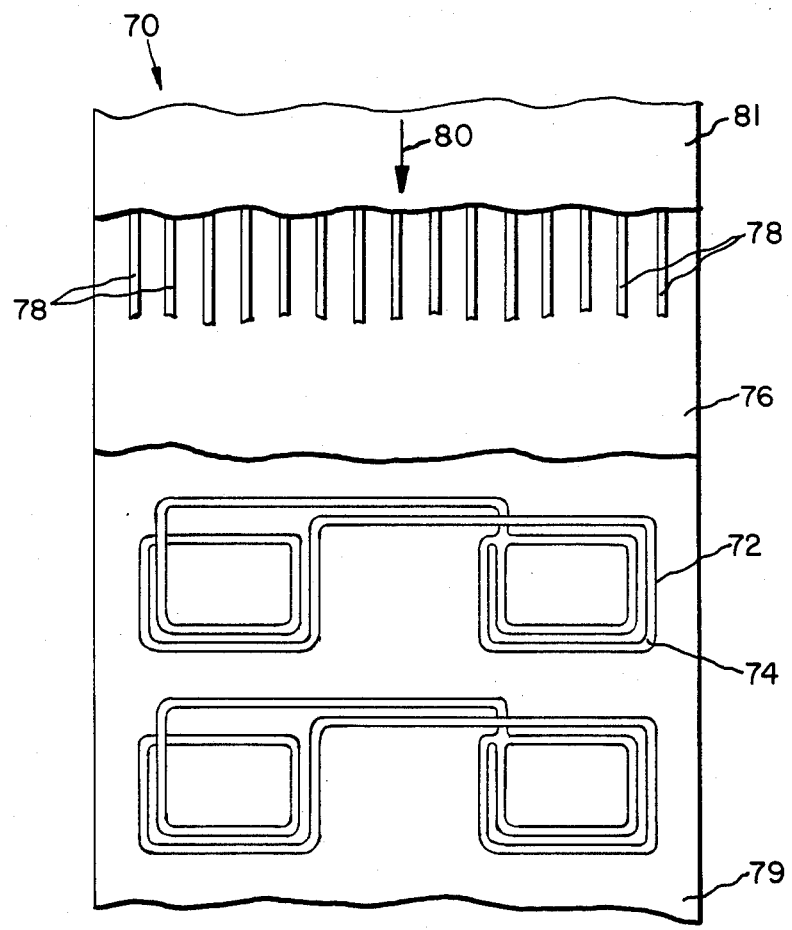
FIG. 6 is a plan view of a cable reinforced belt embodying the invention, partially cut away to expose the structural layers of the belt.

In FIG. 6 a cable reinforced belt 70 is shown cut away to expose successive layers of the construction. The belt contains transversely oriented envelopes 72 with each envelope containing a conductor 74 arranged in a suitable shaped form. The elastomeric body 76 of the belt contains cable reinforcements 78 which are oriented parallel to the direction of travel indicated by arrow 80. This type of very heavy duty conveyor belt is capable of carrying extremely heavy loads of ores or other bulk materials over very long distances. This type of heavy duty conveyor is particularly susceptible to longitudinal tears, rips or slits developing due to the cutting of the elastomeric body material 76 by sharp edges which may be wedged into contact with the belt. Since there are no transverse elements to prevent the sharp object from continuing to split the belt carcass as it runs, extensive damage over very long lengths of these belts is possible. The splicing of new sections into cable reinforced belting is a difficult and time consuming task which requires the whole conveyor system to be shut down while the resplicing and vulcanization of the repair section is effected. The cut away belting shown in FIG. 6 would preferably have the conductors 74 positioned between the outer pulley cover 79 and the cables 78. This placement is preferred since on the carrying cover 81 side of the belt is subjected to extreme abuse during loading and unloading of the cargo. If the conductors 74 were placed on the carrying side of the belt they might be subject to physical abuse leading to discontinuities in the conductor and failure of the desired magnetic or electric continuity. In an alternative embodiment of the invention, the enveloped conductor may be positioned on the surface of the outer pulley cover utilizing a relatively thin rubber covering which serves to both protect the conductor and also to adhere the enveloped conductor to the belt surface. This embodiment is especially useful where an embedded conductor array becomes damaged during service and a replacement conductor must be positioned on the belt in order to assure full coverage of the belt by the rip detector system. The envelope allows the conductor to easily slide as the belt is deformed by the pulleys during its travel over the conveying system.

Figure 7:
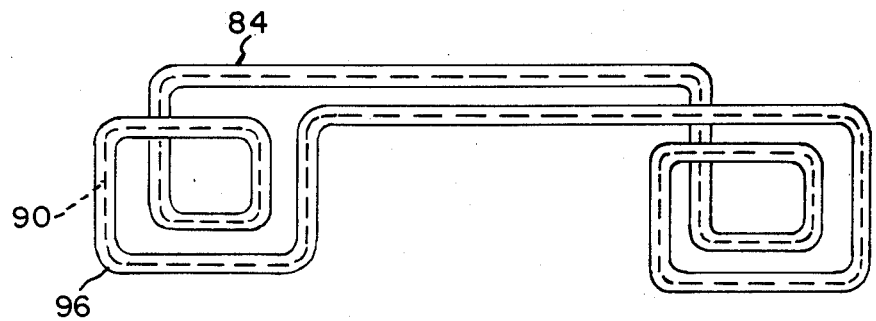
FIGS. 7, 8 and 9 are diagrammatic views of alternative forms of shaped conductor arrays of this invention. The actual configuration would be designed to be compatible with the system.
Figure 8:
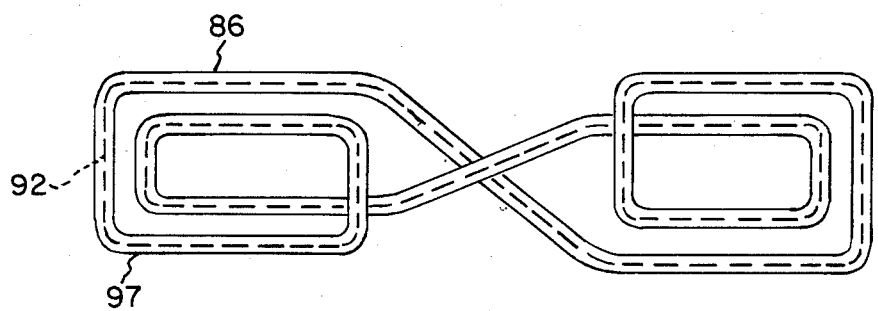
Figure 9:
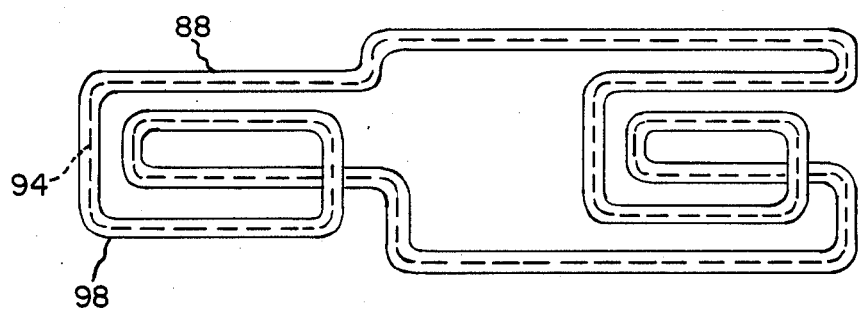

Referring now to FIGS. 7, 8 and 9, there are shown schematic representations of alternative configurations of conductor coils 84, 86 and 88 which contain conductors 90, 92 and 94 positioned within envelopes 96, 97 and 98 produced according to this invention. It is understood that the conductors which may be protected within the envelopes according to this invention can be of any configuration including straight transverse wires, loops, figure eights and other complex polygons both electrically continuous and discontinuous depending on whether the detection means utilized requires a closed circuit or an open-circuit in order to function.

While certain representative embodiments and details have been shown for the purpose of illustrating the invention, it will be apparent to those skilled in this art that various changes and modifications may be made therein without departing from the spirit or scope of the invention.

What is claimed is:

1. A reinforced conveyor belt having included therein a conductor for use in a rip monitoring system, said belt comprising:
   (a) an elastomeric body having an upper carrying surface and a parallel lower pulley engaging surface, each surface extending indefinitely in a direction of travel of the belt;
   (b) a plurality of reinforcement layers positioned within said elastomeric body;
   (c) a plurality of envelopes of low coefficient of friction material positioned within said elastomeric body and spaced apart in the direction of travel of the belt, wherein each envelope establishes a void area in said elastomeric body within said envelope; and
   (d) a shaped conductor positioned within said envelope such that said conductor is free to move within said void area during operation of said reinforced conveyor belt.

2. A belt according to claim 1 wherein said envelope is composed of a thermoplastic material which is resistant to deformation during fabrication of said belt.

3. A belt according to claim 1 wherein said envelope is composed of a material selected from the group consisting of polyester, polyacrylate, fluorocarbon plastics, poly(amide-imide), nylon, acrylic, polyurethane, polyvinylchloride, and silicone.

4. A belt according to claim 1 wherein said envelope is formed from at least two opposed planar sheets of thermoplastic resin sealably joined at the edges by a means for adhering to form said void area between said opposed planar sheets.

5. A belt according to claim 1 wherein said envelope is formed as an extruded cross-section of low coefficient of friction material.

6. A belt according to claim 1 wherein said void area is a substantially planar area parallel to the pulley engaging surface of said belt in which said conductor may freely slide within said envelope.

7. A belt according to claim 1 wherein said conductor is a ductile wire.

8. A belt according to claim 7 wherein said wire is in the form of a braid.

9. A belt according to claim 8 wherein said braided wire is axially foreshortened and flattened to form a flattened braid having a minimal thickness.

10. A belt according to claim 1 wherein said conductor is in the form of a loose linear coil.

11. A belt according to claim 1 wherein said shaped conductor takes the form of a complex polygon.

12. A belt according to claim 1 wherein said conductor takes the form of a figure eight loop.

13. A belt according to claim 1 wherein said reinforcement layers include at least one planar layer of steel cables running in the direction of travel of the belt and extending substantially the full width of said belt, and wherein said plurality of envelopes are positioned on one side of said planar layer of steel cables.

14. A belt according to claim 1 wherein said reinforcement layers are fabric layers and wherein said envelopes are positioned between two adjacent fabric layers.

15. A belt according to claim 1 wherein said reinforcement layers are fabric layers and wherein said plurality of envelopes are positioned between the outermost said fabric layer and the adjacent pulley engaging surface or carrying surface of said belt.

16. A belt rip monitoring system comprising: a belt; a means for supporting said belt; a means for driving said belt connected to a means for detecting signals from said belt; and a means for controlling the driving means, said belt having
   (a) an elastomeric body having an upper carrying surface and a lower pulley engaging surface each parallel to a direction of travel of the belt;
   (b) a plurality of reinforcement layers positioned within said elastomeric body extending substantially over the full dimension of said belt;
   (c) a plurality of envelopes of low coefficient of friction material positioned within said elastomeric body and spaced apart in the direction of travel of the belt, wherein each envelope establishes a void area in said elastomeric body within said envelope; and
   (d) a shaped conductor positioned within each of said envelopes such that said conductor is free to move within said void area during operation of said reinforced conveyor belt.

* * * * *